US011651147B2

(12) United States Patent
Heyns

(10) Patent No.: US 11,651,147 B2
(45) Date of Patent: May 16, 2023

(54) METHOD AND SYSTEM FOR INTELLIGENTLY DETECTING AND MODIFYING UNORIGINAL CONTENT

(71) Applicant: Microsoft Technology Licensing, LLC, Redmond, WA (US)

(72) Inventor: Michael Gary Heyns, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/779,025

(22) PCT Filed: Dec. 4, 2020

(86) PCT No.: PCT/US2020/063216
§ 371 (c)(1),
(2) Date: May 23, 2022

(87) PCT Pub. No.: WO2021/113578
PCT Pub. Date: Jun. 10, 2021

(65) Prior Publication Data
US 2022/0414317 A1 Dec. 29, 2022

(30) Foreign Application Priority Data
Dec. 4, 2019 (NL) .................................. N2024377

(51) Int. Cl.
*G06F 17/00* (2019.01)
*G06F 40/166* (2020.01)
(Continued)

(52) U.S. Cl.
CPC .......... *G06F 40/166* (2020.01); *G06F 3/0482* (2013.01); *G06F 40/117* (2020.01); *G06F 40/289* (2020.01); *G06N 20/00* (2019.01)

(58) Field of Classification Search
CPC .... G06F 40/166; G06F 3/0482; G06F 40/117; G06F 40/289; G06N 20/00
See application file for complete search history.

(56) References Cited

U.S. PATENT DOCUMENTS 9,514,417 B2 12/2016 Kumar et al.
11,417,339 B1* 8/2022 Wang .................... G10L 15/197
(Continued)

FOREIGN PATENT DOCUMENTS

KR 101629210 B1 6/2016

OTHER PUBLICATIONS

Garner, Harold R. "Combating unethical publications with plagiarism detection services." Urologic oncology: Seminars and original investigations. vol. 29. No. 1. Elsevier, 2011 (Year: 2011).*
(Continued)

*Primary Examiner* — Andrew T McIntosh
(74) *Attorney, Agent, or Firm* — NovoTechIP International PLLC

(57) ABSTRACT

A method and system for providing replacement text segment suggestions for an unoriginal text segment in a document may include examining a portion of the document to determine if the portion includes a text segment containing unoriginal content. Upon determining that the portion includes the unoriginal text segment, the method may enable display of a notification that the text segment contains unoriginal content and receive a request, via a network, to provide the replacement text segment for the unoriginal text segment. Upon receiving the request, the method may identify the replacement text segment for the text unoriginal segment, based at least in part a guideline relating to the use of content that is included in a source. The replacement text segment may include a citation for the source.

20 Claims, 14 Drawing Sheets

(51) Int. Cl.
*G06N 20/00* (2019.01)
*G06F 3/0482* (2013.01)
*G06F 40/117* (2020.01)
*G06F 40/289* (2020.01)

(56) References Cited

U.S. PATENT DOCUMENTS

| | | |
|---|---|---|
| 2013/0054612 A1* | 2/2013 | Danielyan ............. G06F 40/268 707/741 |
| 2014/0229481 A1 | 8/2014 | Qureshi et al. |
| 2015/0186787 A1* | 7/2015 | Kumar ................. G06Q 10/107 707/758 |
| 2020/0067861 A1* | 2/2020 | Leddy ................. G06F 21/6245 |
| 2020/0162561 A1* | 5/2020 | Milvaney ................ G06F 9/542 |
| 2020/0226206 A1* | 7/2020 | Brake ..................... G06F 40/30 |

OTHER PUBLICATIONS

Foltýnek, Tomáš, Norman Meuschke, and Bela Gipp. "Academic plagiarism detection: a systematic literature review." ACM Computing Surveys (CSUR) 52.6 (2019): 1-42 (Year: 2019).*

Ahmed, R. A. "Overview of different plagiarism detection tools." International Journal of Futuristic Trends in Engineering and Technology 2.10 (2015): 1-3 (Year: 2015).*

"Search Report and Written Opinion Issued in Netherlands Patent application No. N2024377", dated Jul. 8, 2020, 9 Pages.

"International Search Report and Written Opinion Issued in PCT Application No. PCT/US20/063216", dated Feb. 16, 2021, 13 Pages.

Seaward, et al., "Intrinsic Plagiarism Detection using Complexity Analysis", In Proceedings of Annual Conference of the Spanish Society for Natural Language Processing, Sep. 2009, pp. 56-61.

* cited by examiner

Unoriginal Content 270  
250  
240  
230  
235  
245  
220  
210  
200A

File | Home | Insert | Design | Review | View | Help

Therefore, even by 1894 we see Monet experimenting in using both impressionism and classical elements simultaneously. This epitomizes the stylistic changes that he made throughout his career. This piece shows the sea as water is hitting the rocks. Telling by the sharply contrasting white in the water, Monet was most likely trying to show the strong turbulent waves.

By the time he co... Water Lillies
series, Monet's s... ...modate the
negative aspects o... ...c landscape.
Firstly, the critici... painting a
cathedral and the f... ...rter of a

| Cut |
| Copy |
| Paste |
| Font |
| Paragraph |
| Detect Unoriginal Content |
| Synonym |
| New Comment |

Detect Unoriginal Content

FIG. 2B

Unoriginal Content — 270, 310, 315, 320

32% of your document is similar to other sources

Unoriginal passages: 12

Identify Unoriginal Content

File  Home  Insert  Design  Review  View  Help

Therefore, even by 1894 we see Monet experimenting in using both impressionism and classical elements simultaneously. This epitomizes the stylistic changes that he made throughout his career. This piece shows the sea as water is hitting the rocks. Telling by the sharply contrasting white in the water, Monet was most likely trying to show the strong turbulent waves.

By the time he concluded his career with the Water Lillies series, Monet's style had adapted to accommodate the negative aspects of impressionisms in a realistic landscape. Firstly, the criticism he had received from painting a cathedral and the fact that he spent nearly a quarter of a

FIG. 3B

METHOD AND SYSTEM FOR INTELLIGENTLY DETECTING AND MODIFYING UNORIGINAL CONTENT

TECHNICAL FIELD

This disclosure relates generally to intelligent detection and correction of unoriginal content, and, more particularly, to a method of and system for intelligently identifying unoriginal content, suggesting replacement text segments for the identified unoriginal content, and providing correct citations for the identified unoriginal content and/or the selected replacement text segment.

BACKGROUND

Computer users often use various content creation applications to create textual content. For example, users may utilize an application to write an email, prepare an essay, document their work, prepare a presentation and the like. Often during the writing process, a person may consult various references to conduct research and gather the information required for the document they are preparing. However, users are often not aware of rules governing plagiarism and how and when content borrowed from other references should be used and cited.

Furthermore, sometimes users are not aware of how much their writing has been affected by references they have consulted. A user may read multiple references, conduct other research, begin writing a paper thinking that they are using their own words and not realizing that their writing has been affected by the references they studied.

To address these issues, some current applications offer plagiarism detection by analyzing content of a document, determining if there are segments that are sufficiently close to publicly available documents, and identifying those segments to the user. However, these applications often merely identify the potentially problematic segments and the reference with which a similarly was detected. The user would still have to determine how to address the issue, which is often confusing for most users.

Hence, there is a need for improved systems and methods of intelligently detecting unoriginal content and providing mechanisms for modifying the unoriginal content.

SUMMARY

In one general aspect, the instant application describes a data processing system having a processor and a memory in communication with the processor wherein the memory stores executable instructions that, when executed by the processor, cause the data processing system to perform multiple functions. The functions may include examining a portion of a document to determine if the portion includes a text segment containing unoriginal content. Upon determining that the portion includes the text segment, the functions may include enabling display of a notification on a user interface that the text segment contains unoriginal content. The functions may further include receiving a request, via a network, to provide a replacement text segment for the text segment, and upon receiving the request, identifying at least one replacement text segment for the text segment, based at least in part on one or more rules governing use of content from a source. The replacement text segment may include a citation for the source.

In yet another general aspect, the instant application describes a method for providing replacement text segment suggestions for an unoriginal text segment in a document. The method may include examining a portion of the document to determine if the portion includes a text segment containing unoriginal content, and upon determining that the portion includes the unoriginal text segment, enabling display of a notification on a user interface that the text segment contains unoriginal content. The method may also include receiving a request, via a network, to provide the replacement text segment for the unoriginal text segment, and upon receiving the request, identifying the replacement text segment for the text unoriginal segment, based at least in part on one or more rules governing use of content from a source. The replacement text segment may include a citation for the source.

In a further general aspect, the instant application describes a non-transitory computer readable medium on which are stored instructions that when executed cause a programmable device to examine a portion of a document to determine if the portion includes a text segment containing unoriginal content. Upon determining that the portion includes the text segment, the instructions may cause the programmable device to enable display of a notification on a user interface that the text segment contains unoriginal content, receiving a request, via a network, to provide a replacement text segment for the text segment, and upon receiving the request, identifying at least one replacement text segment for the text segment, based at least in part on one or more rules governing use of content from a source. The replacement text segment may include a citation for the source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2A-2B are example graphical user interface (GUI) screens for allowing a user to request identification of unoriginal content in a document.

FIGS. 3A-3H are example GUI screens for displaying detected unoriginal content and providing guidance to the user on how to modify the detected unoriginal content.

DETAILED DESCRIPTION

Figure 1:
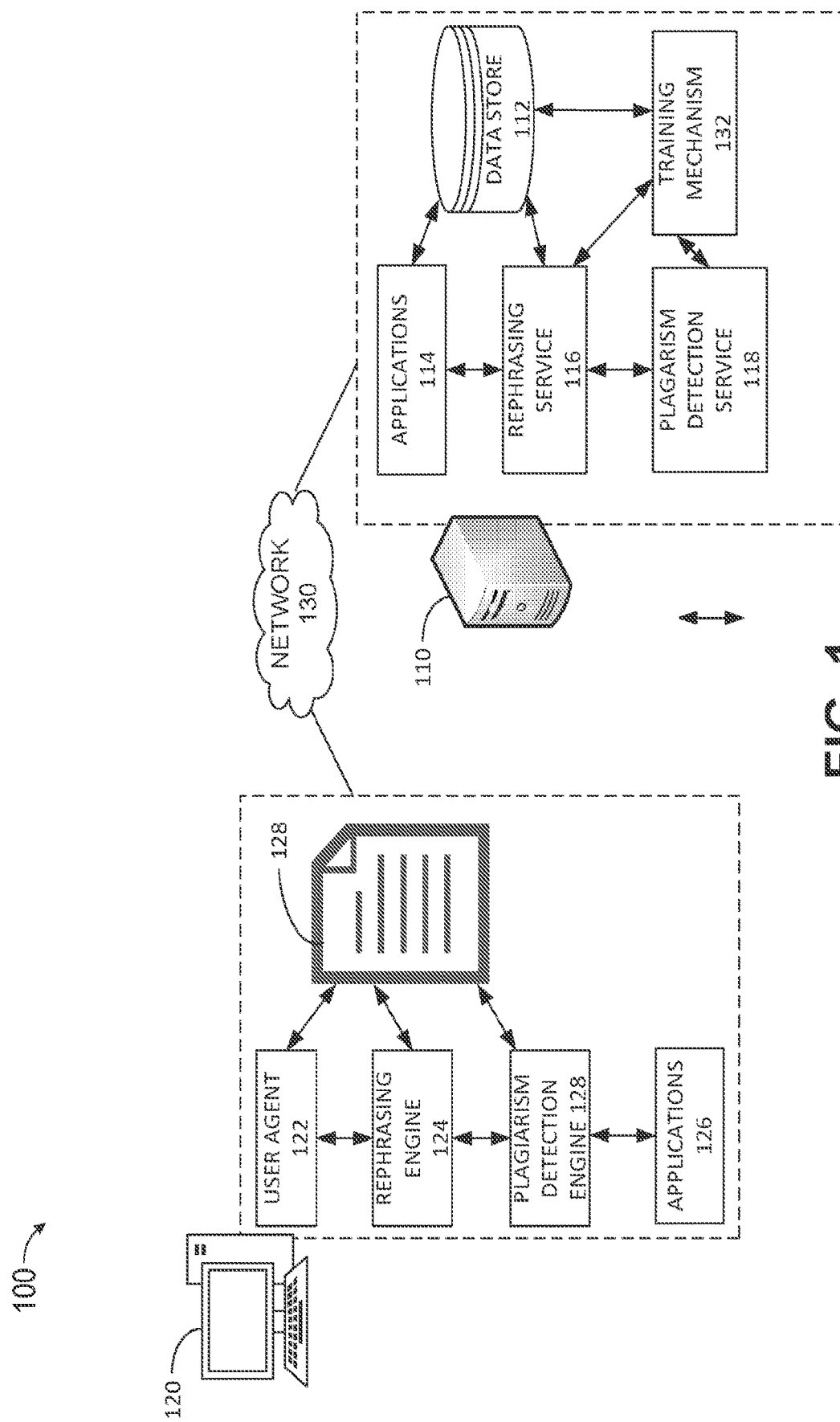
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Ensuring a document that is provided for a project or published publicly is devoid of plagiarized content is an important task for most creators of documents. However, when a person studies many sources before creating a document, it is sometimes difficult for them to realize how much and where their writing has been influenced by others. Furthermore, even if they are aware of the influence, they may not have the knowledge of how to modify the language or provide correct citations to avoid plagiarism. In recent years, some plagiarism detection applications have been developed to help users identify segments in their document that are sufficiently similar to publicly available documents. These applications may help users identify unoriginal content that may be labeled as plagiarized. However, while providing some useful information, currently used plagiarism detection mechanisms often fail to assist users in determining how to address the unoriginal content. While it may be helpful to know that a document contains problematic content, this knowledge does not resolve the challenge of avoiding plagiarism within the current document and/or in the future. Thus, currently used applications suffer from the technical problem of merely identifying the problematic segments without providing any integrated mechanism by which the user can address the issue to avoid plagiarism. As a result, users often have to spend a significant amount of time determining how to modify the problematic language, what the proper citation format is, and when they need to provide citation.

To address these technical problems and more, in an example, this description provides a technical solution used for intelligently identifying unoriginal content, suggesting rewrites for the identified content and automatically providing proper citations based on the type of rewrite selected. To do so, techniques may be used to receive a request to identify unoriginal segments within a document, utilize one or more plagiarism detection services to identify unoriginal segments, and provide suggestions for rewriting an identified unoriginal segment. Upon receiving a selection of a suggested rewrite, the identified unoriginal content may be automatically replaced by the selected suggested rewrite. A proper citation may automatically be added to the selected suggested rewrite or to a specific portion of the document to ensure that even when the unoriginal content is replaced by a rewritten segment, proper citation is provided. As a result, the technical solution provides an improved method of providing an integrated solution for identifying and addressing unoriginal content within a document by allowing a user to easily review unoriginal content and suggested rewrites to select how to replace the unoriginal content.

As will be understood by persons of skill in the art upon reading this disclosure, benefits and advantages provided by such implementations can include, but are not limited to, a technical solution to the technical problems of inefficient and insufficient information and resources provided for addressing unoriginal content in a document. Technical solutions and implementations provided herein optimize the process of detecting and addressing unoriginal content in a document by not only identifying the unoriginal segments, but also providing the user with options to quickly and efficiently modify the content to address the issue. This may eliminate the need for the user to come up with their own alternative way of rewriting text segments that comply with rules governing plagiarism, and yet provide the user an opportunity to be the decision maker as to which text segment is the most appropriate for the document, thus increasing accuracy and relevancy. The benefits provided by these technology-based solutions yield more user-friendly applications, increased accuracy and increased system and user efficiency.

As a general matter, the methods and systems described herein may include, or otherwise make use of, a machine-trained model to identify contents related to a text. Machine learning (ML) generally involves various algorithms that a computer can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various words and contents (e.g., icons, images, or emoticons) and/or identify suggested contents that relate to a text entered by a given user. Such determination may be made following the accumulation, review, and/or analysis of user data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of contents and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates an example system 100, upon which aspects of this disclosure may be implemented. The system 100 may include a sever 110 which may be connected to or include a data store 112. The data store 112 may function as a repository in which documents and/or data sets relating to training models for providing intelligent detection of unoriginal content and providing intelligent rephrasing for the detected content may be stored. The server 110 may operate as a shared resource server located at an enterprise accessible by various computer client devices such as client device 120. The server may also operate as a cloud-based server for offering global plagiarism detection and rephrasing services.

The server 110 may include and/or execute a plagiarism detection service 118 for providing intelligent detection of unoriginal content in a document for users within an enterprise and/or globally for a group of users. The plagiarism detection service 118 may operate to divide a document into one or more segments, perform searches on the segments, determine if any of the segments fall outside of an acceptable range of being different from an identified reference, and if so identify the segment as possible unoriginal content for providing to the user.

The rephrasing service 116 may provide intelligent replacement text segment suggestions for any identified unoriginal content within an enterprise and/or globally for a group of users. The rephrasing service 116 may operate to examine an identified unoriginal text segment, examine rules governing plagiarism, review the remaining content of the document along with context and other linguistic and non-linguistic features of the document to intelligently suggest one or more replacement text segment options that avoid plagiarism while being in harmony with the context and tone of the document. If applicable, for each of the suggested replacement text segments, the rephrasing service 116 may also provide one or more properly formatted citations. In one example, more than one type of citation formatting may be provided for the user to choose from. In one implementation, the plagiarism detection and rephrasing services are cloud-based services. The rephrasing service may be provided by one or more rephasing ML models that take into plagiarism rules.

Each of the models used as part of the plagiarism detection and rephrasing services may be trained by a training mechanism 132. The training mechanism 132 may use training datasets stored in the data store 112 to provide initial and ongoing training for each of the model(s). In one implementation, the training mechanism 132 may use labeled training data from the data store 112 (e.g., stored user input data that is labeled) to train each of the model(s) via deep neural networks. The initial training may be performed in an offline stage.

The server 110 may also include or be connected to one or more online applications 114 that provide access to or enable creation and/or editing of one or more documents. The client device 120 may be connected to the server 110 via a network 130. The network 110 may be a wired or wireless network(s) or a combination of wired and wireless networks that connect one or more elements of the system 100. The client device 120 may be a personal or handheld computing device having or being connected to input/output elements that enable a user to interact with an electronic document 128 on the client device 120. Examples of suitable client devices 120 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 5 and 6.

The client device 120 may include one or more applications 126. Each application 126 may be a computer program executed on the client device that configures the device to be responsive to user input to allow a user to interactively view, generate and/or edit the electronic document 128. The electronic document can contain any type of data, such as text (e.g., alphabets, numbers, symbols), emoticons, gifs, still images, video and audio. The application 126 may process the electronic document, in response to user input through an input device, to create and/or modify the content of the electronic document, by displaying or otherwise presenting display data, such as a GUI which includes the content of the electronic document to the user. Examples of suitable applications include, but are not limited to, a word processing application, a presentation application, a note taking application, a text editing application, an email application, a spreadsheet application, a desktop publishing application, and a communications application.

In some examples, applications used to create, modify and/or view content of an electronic document may be online applications such as applications 114 that are run on the server 110 and provided via an online service as described above. In one implementation, web applications 114 may communicate via the network 130 with a user agent 122, such as a browser, executing on the client device 120. The user agent 122 may provide a user interface (UI) that allows the user to interact with application content and electronic documents stored in the data store 112. The (UI) may be displayed on a display device of the client device 120 by utilizing for example the user agent 122. In some examples, the user agent 122 may be a dedicated client application that provides a (UI) and access to electronic documents stored in the data store 112. In other examples, applications used to create, modify and/or view content of an electronic document maybe local applications such as the applications 126 that are stored and executed on the client device 120, and provide a (UI) that allows the user to interact with application content and electronic document 128.

In one implementation, the client device 120 may include a local plagiarism detection engine 128 for detecting unoriginal content in documents such as the electronic document 128. In an example, the local plagiarism detection engine 128 may operate with the applications 126 to offer some plagiarism detection services locally. For example, when the client device 120 is offline, the local plagiarism detection may make use of one or more local or enterprise-based repositories to provide plagiarism detection. Furthermore, the client device 120 may include a local rephrasing engine 124 for providing local rephrasing services, when needed (e.g., when the client device is offline).

Figure 2A:
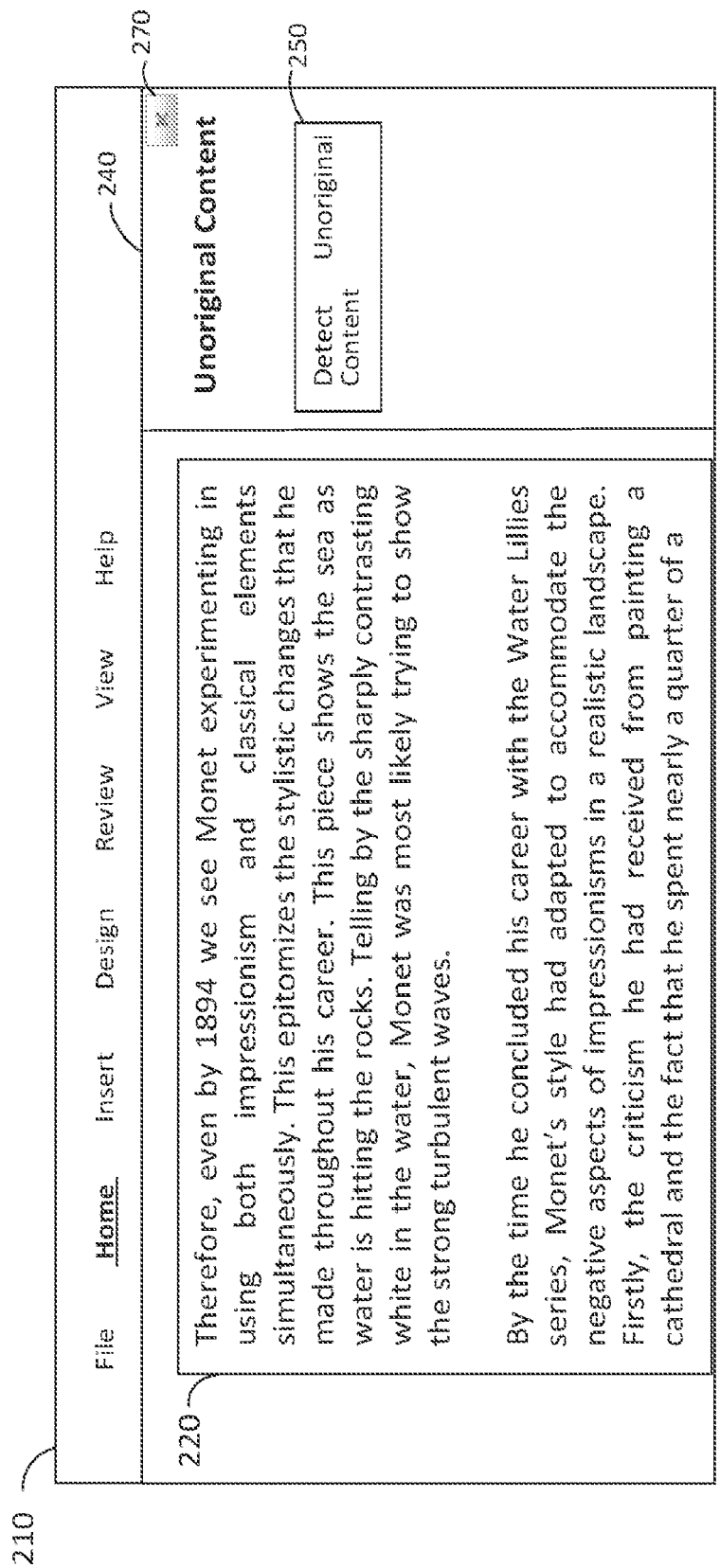

FIG. 2A-2B are example GUI screens for allowing a user to request identification of unoriginal content in a document. FIG. 2A is an example GUI screen 200A of a word processing application (e.g., Microsoft Word®) displaying an example document. GUI screen 200A may include a toolbar menu 210 containing various menu options, each of which may provide multiple UI elements for performing various tasks. For example, the toolbar menu 210 may provide options for the user to perform one or more tasks to create or edit the document. Screen 200A may also contain a content pane 220 for displaying the content of the document. The content may be displayed to the user for viewing and/or editing purposes and may be created by the user. For example, the user may utilize an input device (e.g., a keyboard) to insert input such as text into the content pane 220.

In one implementation, the GUI screen 200A may include an unoriginal content pane 240, which may be displayed alongside the content pane 220 to provide an avenue for the user to request detection of unoriginal content, to view suggested rewrites and/or select options for modifying the content, as needed. Displaying a separate pane 240 alongside the content pane 220 may assist the user to move between identified unoriginal segments and view and approve suggested replacement text segments as the user is working on the document. In this manner, the user can review information about the detected unoriginal segments and about suggested replacement text segments within the context of the whole document to determine if a rewrite is appropriate. For example, the user may be able to determine whether the rewrite fits the style of the previous or next paragraphs. However, although shown as a separate pane in screen 200A, it should be noted that other UI configurations may be utilized to request detection of unoriginal content, to view suggested rewrites and/or select options for modifying the content. For example, a pop-up menu may be used, in one implementation. Additionally, although the unoriginal content pane 240 is shown as being located adjacent to the content pane 220 and on the right side of the GUI screen 200A, the unoriginal content pane 240 may be located anywhere within the GUI screen. Any other method for displaying the unoriginal content pane 240 simultaneously on the same screen as the content pane may be utilized. In one implementation, the unoriginal content pane 240 is displayed in the GUI screen 200A upon selection of a menu option, such as one of the menu options provided in the toolbar menu 210. In another implementation, the unoriginal content pane 240 is displayed when upon pre-selection of an option to automatically run unoriginal content detection, the application performs occasional unoriginal content detection in the background and detects one or more unoriginal content segments within the document. In either case, a close pane menu option 270 may be utilized to remove the unoriginal content pane 240.

As the user creates or edits the content of the content pane 220, a UI element such as the menu option 250 may be provided in the unoriginal content pane 240 for transmitting a request to detect unoriginal content within the document. In one implementation, upon selection of the menu option 250, the application may examine the entire document by dividing the document into smaller segments and conducting searches for each of the segments, as further discussed below, to detect all potential unoriginal content within the entire document.

Alternatively, a user may be able to select a text segment within the document and transmit a request for identifying unoriginal content within the selected text segment. This may be done by utilizing a menu option as displayed in GUI screen 200B of FIG. 2B. When a text segment, such as the selected segment 245 is selected by for example, a drag and drop operation, the selected segment may be highlighted. Utilizing one or more UI input elements (e.g., a right-click operation) may then enable the display of a context menu, such as the context menu 230. Along with many different options for editing the document, the context menu 230 may also provide a menu option 235 for invoking detection of unoriginal content within the selected segment. Selecting the menu option 235 may cause the application to only examine the selected text segment for detecting potential unoriginal content.

It should be noted that the context menu 230 is only an example mechanism for initiating the display of a UI element for requesting detection of unoriginal content within a selected text segment. Many other methods of selecting a portion of the content pane and initiating the display of a UI element for detection of unoriginal content are possible. For example, a menu option may be provided as part of the toolbar 210 for invoking detection of unoriginal content.

Moreover, the selected text segment can be any portion of the textual contents of the document and may include one or more words, sentences or paragraphs. The textual contents may include any type of alphanumerical text (e.g., words and numbers in one or more languages). Thus, a text segment need not correspond to a grammatical unit as commonly understood (such as a sentence or paragraph), but can be any string of characters of any length. In one implementation, a text segment may also include known symbols, emoticons, animations, and the like. Depending on the size of the selected segment, the application may divide the segment into smaller segments before performing a search. Furthermore, if the selected segment includes non-textual elements, such as animations, drawings, or pictures, those elements may be removed before performing the search.

Once a request to detect unoriginal content has been submitted via the menu option 235 or the menu option 250, the application may divide the selected segment or the entire document, as the case may be, into smaller segments, before transmitting a request to a plagiarism detection service to conduct searches on the segments to identify potential unoriginal content. In response, the application may receive a list of segments for which sources have been identified along with information about the identified sources. In one implementation, the application may receive the list of segments and their identified sources as detected unoriginal content. Alternatively, the application may receive a list of segments that have some matches against sources (e.g., sources available via a search engine). Upon receiving this information, the application and/or the plagiarism service may run one or more algorithms to determine a percentage of similarity between each of the identified segments and their corresponding identified source. This may be achieved by for example calculating the number of unoriginal words in the segment as compared with the identified source (e.g., the number of words that appear in both the segment and a similar segment of the identified source).

Furthermore, the percentage of similarity may be calculated by taking into account other factors such as sentence structure, formatting, context and the like. The calculated percentage may then be compared to an acceptable range of similarity to determine whether the percentage of similarity is acceptable. This may be determined based on factors such as rules governing plagiarism. For example, a standard rule may be that if a certain number (e.g., five) consecutive words in a segment are the same as a source, the segment is unoriginal content. Thus, in calculating the percentage of similarity both the number of the same words and their order may be taken into account. In an example, if the percentage of similarity is between 75 to 100 percent, the segment may be identified as an unoriginal segment. In one implementation, one or more ML models are trained and used to determine whether an identified segment is similar enough to an identified source to constitute as an unoriginal segment.

Figure 3A:
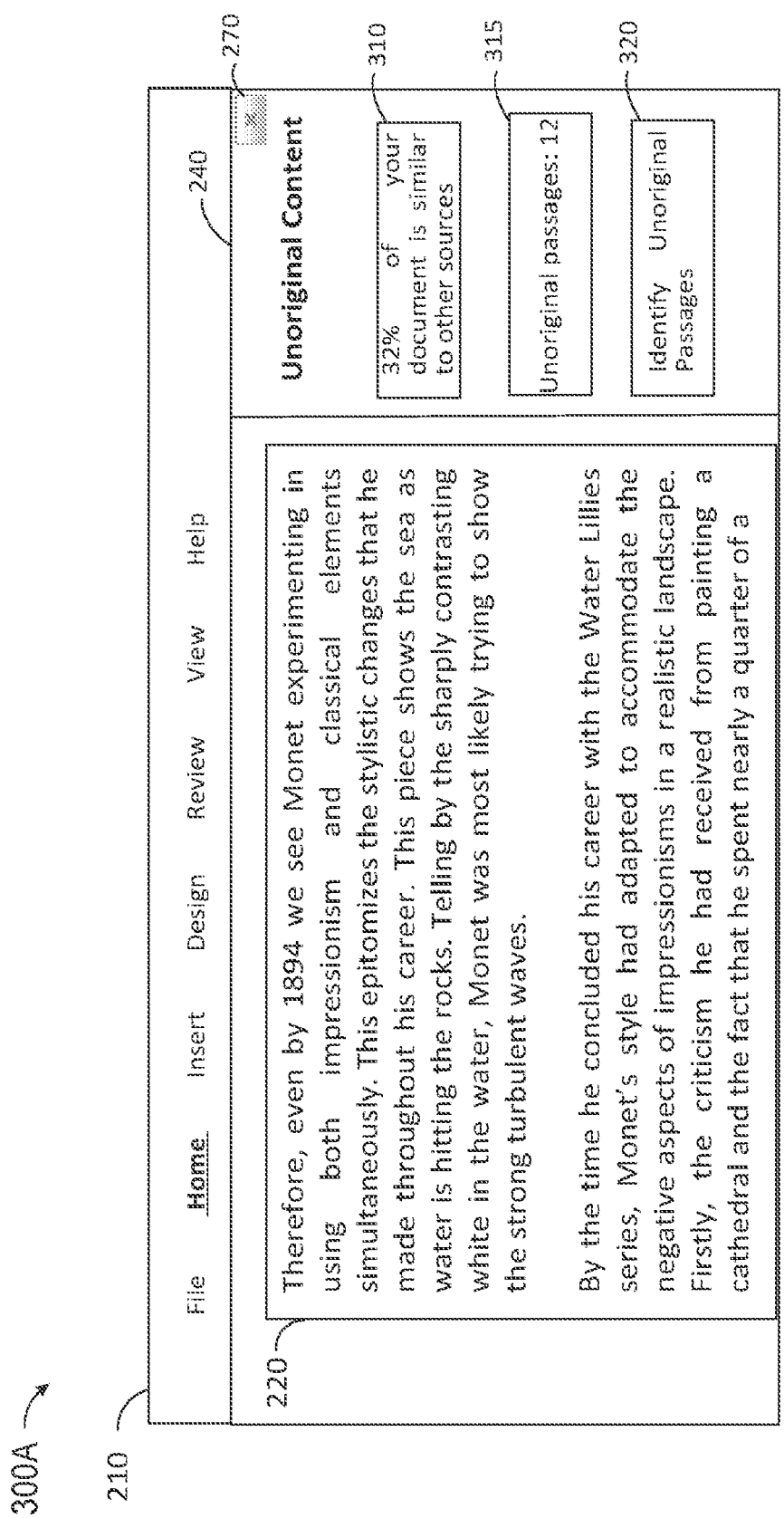

FIGS. 3A-3E are example GUI screens for displaying detected unoriginal content and providing guidance to the user on how to modify the detected unoriginal content to address plagiarism concerns. FIG. 3A depicts an example GUI screen 300A for presenting the results of an unoriginal content detection operation. In one example, a summary of the results may be provided via the unoriginal content pane 240. For example, the UI element 310 may be utilized to display an overall percentage of similarity between the content of the document and available sources as calculated for the document. This may provide an overall assessment for the document. For example, if a document is identified as having a percentage higher than 50% similarity with other sources, the user may realize that a majority of the content of the document includes potential similarity. This may enable the user to determine if the overall content of the document needs to be altered to ensure originality.

The unoriginal content pane 240 may also include a UI element 315 for displaying the number of unoriginal passages detected within the document. This may provide the total number of segments detected at a glance. In addition to providing information regarding the unoriginal content, the unoriginal content pane 240 may also include a UI element 320 for enabling the user to request that the detected unoriginal passages be identified. It should be noted that although UI elements 310, 315 and 320 are displayed as menu options within the unoriginal content pane 240, any other UI element may be utilized to display this information and/or enable the user to request more information.

In one implementation, upon selection of the UI element 320, one or more of the detected unoriginal segments may be highlighted within the content pane 220. Alternatively, a list of the detected unoriginal segments may be displayed in the unoriginal content pane 240, in a pop-menu or via any other UI element. FIG. 3B depicts an example GUI screen 300B for identifying one example detected unoriginal segment 340. As shown in GUI screen 300B, the unoriginal segment 340 is highlighted within the content pane 220 to help identify it. Once a detected unoriginal segment is identified, the user may be able to select it (e.g., by clicking on the segment) to enable one or more operations to be performed on the detected segment to address the unoriginality.

Figure 3C:
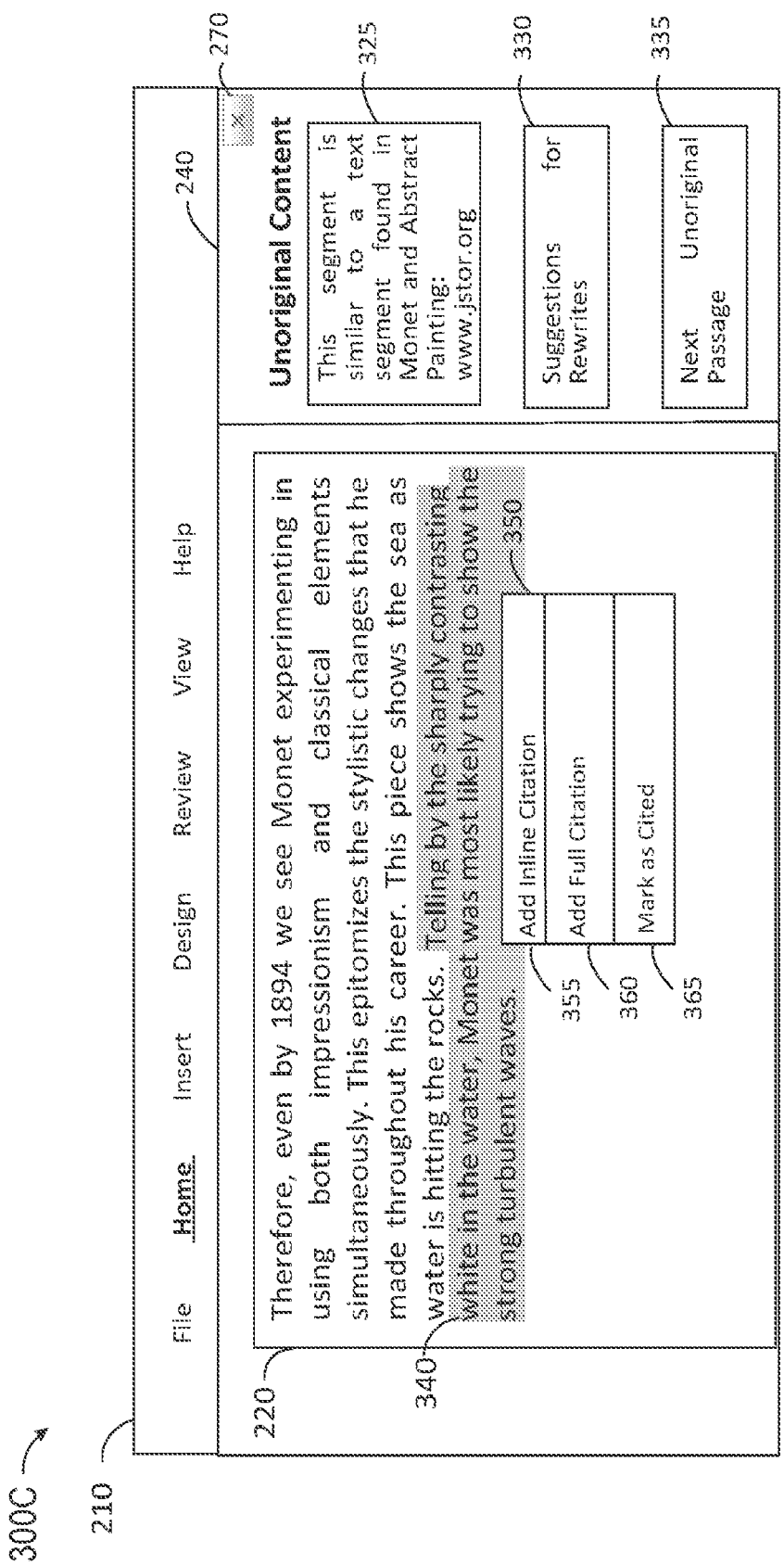

FIG. 3C depicts an example GUI screen 300C for displaying operations that may be performed to modify the identified unoriginal segment to address the unoriginality. In one implementation, once an identified detected segment has been selected, the unoriginal content pane 240 may be modified to display information about the identified unoriginality and/or provide options for altering the identified segment. For example, the unoriginal content pane 240 may include a UI element such as the text box 325 to display information about the source with which the segment is identified as being similar. This may include the title of the source as shown in the UI element 325. Additionally, the information may include a link (e.g., a hyperlink) at which the identified source can be located. In one implementation, the title itself may be a link, upon selection of which the user may be taken, via a browser to the identified source. This may enable the user to review the source to determine for themselves if the identified similarity is correct. In one example, the information displayed in the UI element 325 may include a segment from the source (e.g., a paragraph, a phrase, a sentence or the like) with which the detected unoriginal segment is determined to be similar. The source may be an essay, an article, a book or any other document that is available publicly and can be searched and located online. In one implementation, for enterprise clients, the source may also be any document within an identified enterprise repository of documents.

In addition to information provided about the source, the unoriginal content pane 240 may also include a UI element 330 for enabling the user to request suggestions for rewriting the identified segment. This may enable the user to reduce the percentage of similarity between the identified unoriginal segment and the identified source. For example, the application may display suggestions that replace a majority of words in the segment, change the sentence structure, change the order of the words and the like. In one implementation, to provide proper rewrite suggestions, rules concerning plagiarism and proper use of information from other resources may be taken into account. Furthermore, suggested rewrites may include an appropriate citation to ensure that proper credit is provided for the identified source.

Upon requesting suggestions for rewrites, one or more UI elements may be utilized to display a list of one or more rewrite suggestions for selection and/or further processing. In one implementation, each suggested replacement text segment may be displayed with a dropdown menu. Each suggested replacement text segment may also provide an option for selecting the type of citation included with the replacement text segment.

In an implementation, if none of the suggested replacement text segments seem appropriate to the user, or if the user does not request display of suggested replacement texts and instead chooses to modify the segment by herself/himself, information about the modified segment may be collected, stored and used in providing ongoing training to the algorithms that provide suggested rewrites for unoriginal content. Collection and use of such information, however, may be contingent on compliance with privacy and ethical guidelines and regulations, as discussed further below. Further information about providing suggestions for rewrites is provided in U.S. patent application Ser. No. 16/459,576, filed on Jul. 1, 2019 and entitled "Method and System for Intelligently Suggesting Paraphrases," the entirety of which is incorporated herein.

In one implementation, in addition to the unoriginal content pane 240, one or more other UI elements may be utilized to provide additional options for modifying the identified unoriginal content. For example, upon selection of the text segment 340 and receiving a user input (e.g., a right-click), a context menu such as the context menu 350 may be displayed for providing additional options in addressing the unoriginality of the identified segment.

In one implementation, the context menu 350 may include a menu option 355 for providing an inline citation, a menu option 360 for providing a full citation and a menu option 365 for marking the text segment 340 as cited. The add inline citation menu option 355 may automatically place a citation after the identified segment. The add full citation menu option 360, on the other hand, may provide a full citation at the end of the reference. This may involve for example, adding a full reference to a references section of the document, if one exists or creating one, if one does not exist. In an example, a footnote may be added at the end of the identified text segment 340 that corresponds with the full citation. In one implementation, if an add inline citation is selected, the application may examine the content of the document to determine if a full citation is included for the identified source anywhere within the document. Depending on whether or not a full citation is included, the format of the inline citation may be changed. For example, when a full citation is provided elsewhere, a shortened citation may be inserted inline. If one or more portions of the text segment 340 have been identified as being an exact quotation from the identified source, the process of inserting a citation may include automatically inserting quotation marks around the exact quotes. In one implementation, once an inline and/or a full citation is inserted, the text segment is automatically marked as cited. This may involve removing the text segment from the list of unoriginal content. Once a proper citation is inserted for the text segment 340, the segment is marked as cited, or a suggested rewrite segment for the segment is selected, the application may automatically move to the next unoriginal passage in the document. Alternatively, a user may select to move to the next unoriginal passage by selecting the UI element 335 which may be used to move through the identified unoriginal passages within the document.

Figure 3D:
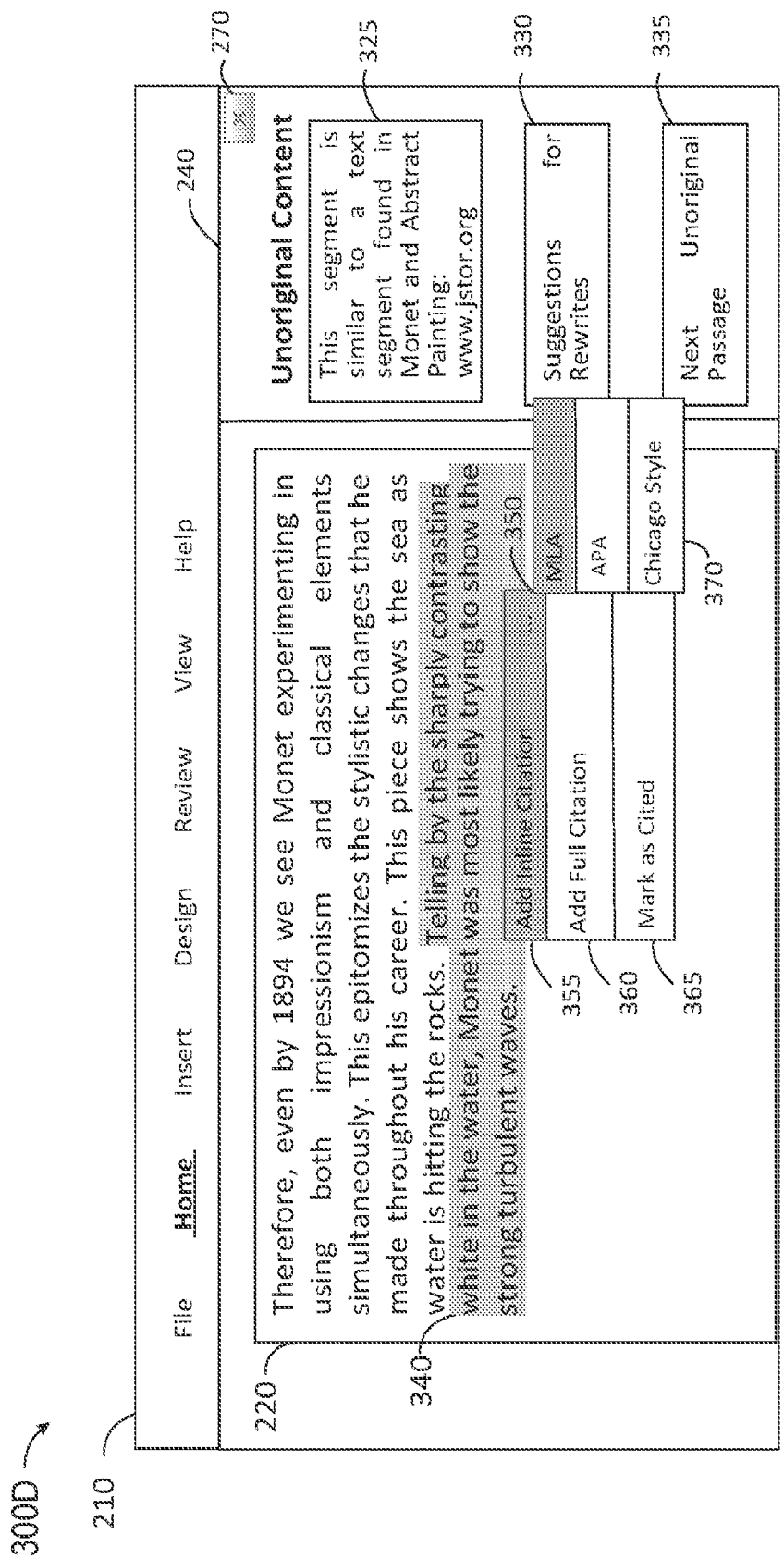
Figure 3E:
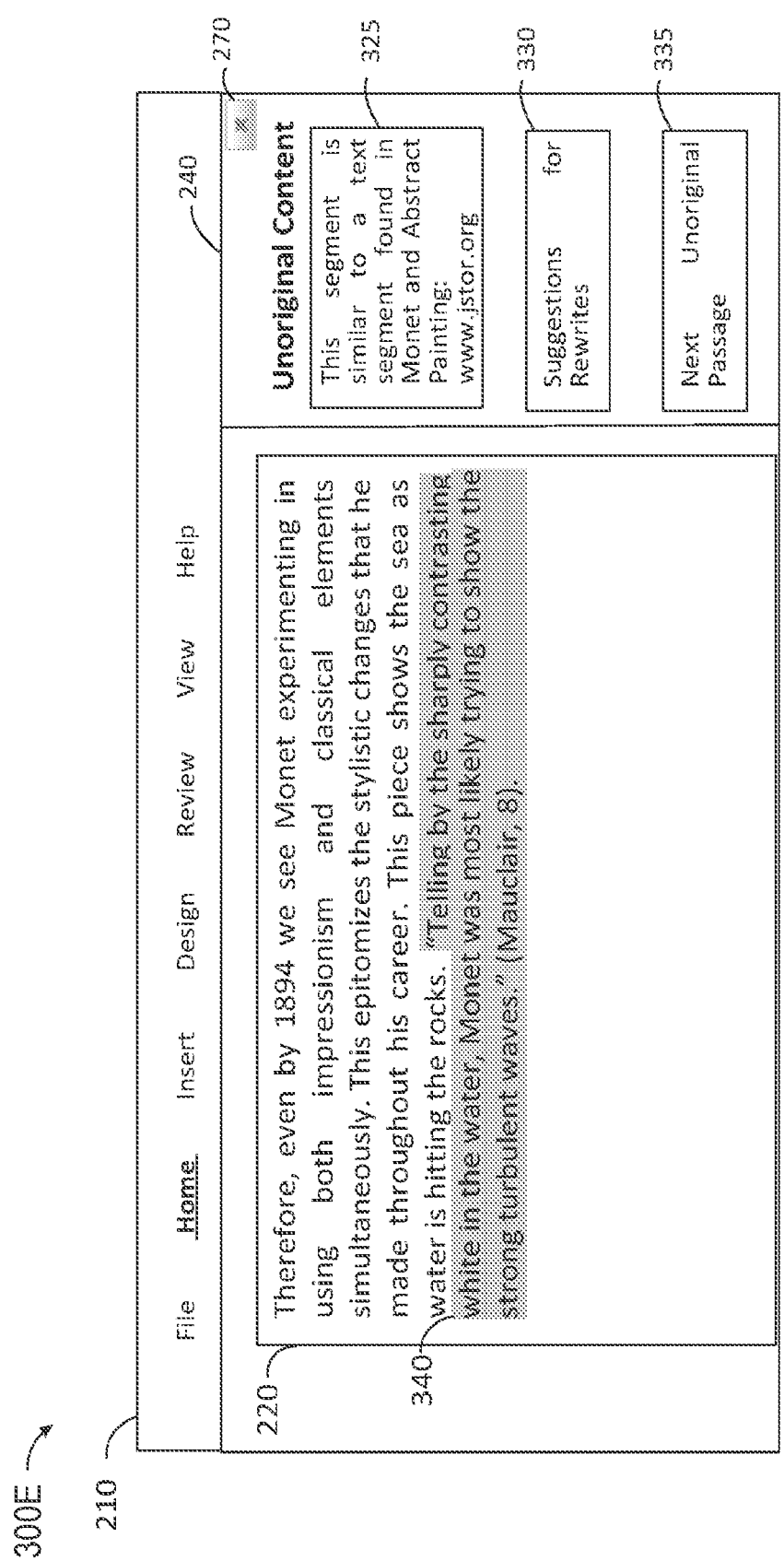

In one implementation, upon selecting to add inline citation to the identified text segment, additional options may be presented to the user for selecting the type of citation used. FIG. 3D depicts an example GUI screen 300D for enabling the user to select the type of inline citation used. In one implementation, hovering a cursor over a portion of the menu option 355 may cause the display of the additional context menu 370. The context menu 370 may provide various options for selecting the type of inline citation used with the text segment. These may include the Modern Language Association (MLA) format which provides a standard format for essays and research papers written in an academic setting, the American Psychological Association (APA) which specifies a format used to cite sources within the social sciences, and the Chicago style source citation format. Many other possible citation formats may be provided. In an example, the types of citation style offered may change with the document. For example, context of the document may be taken into account to determine the subject of the document and thus offer relevant citation formats. Once a citation format is selected in the context menu 370, the text segment may be automatically modified (e.g., quotations inserted and citation added) to add the citation according to the selected citation format, as depicted in GUI screen 300E of FIG. 3E.

Figure 3F:
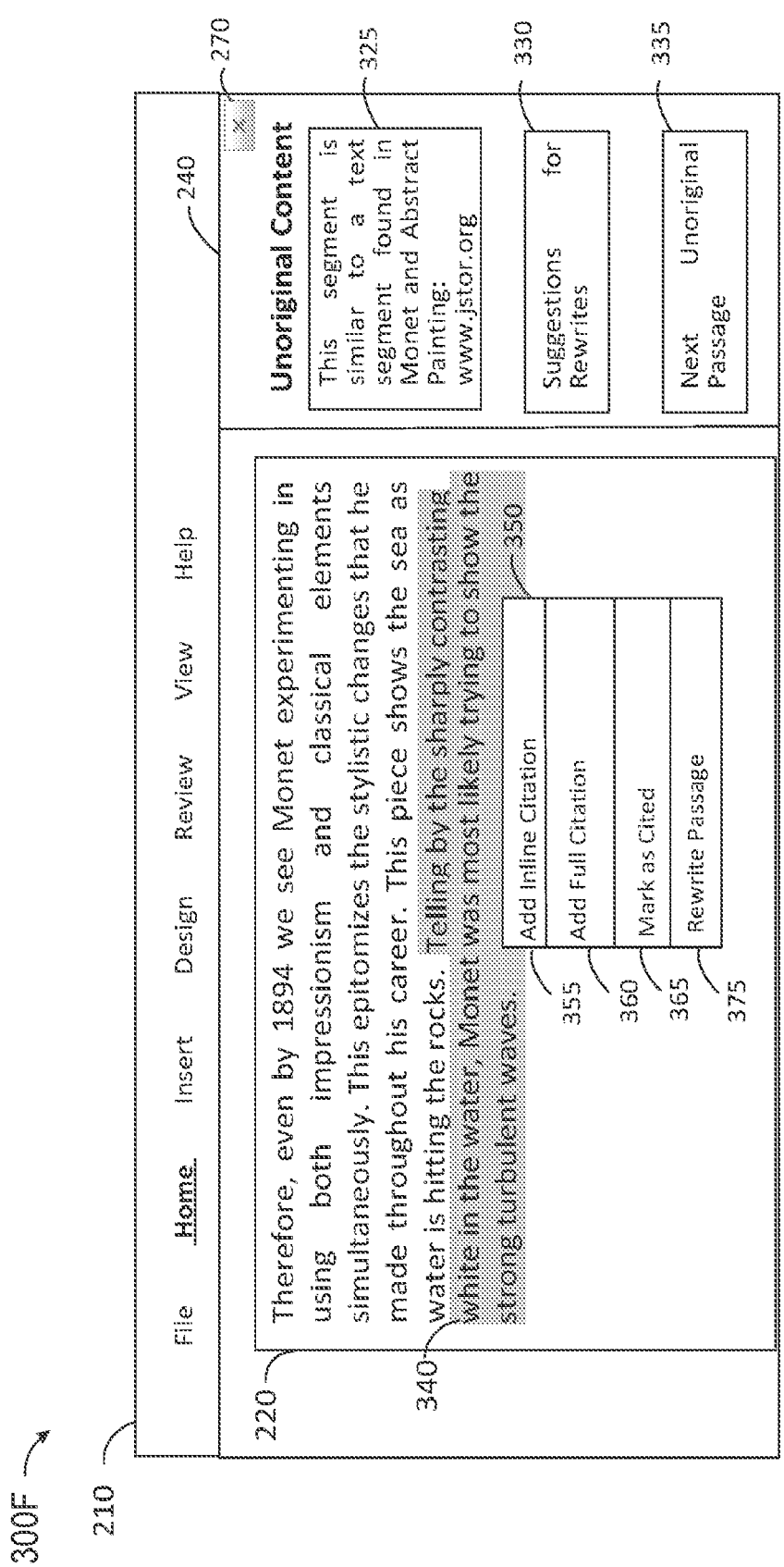
Figure 3G:
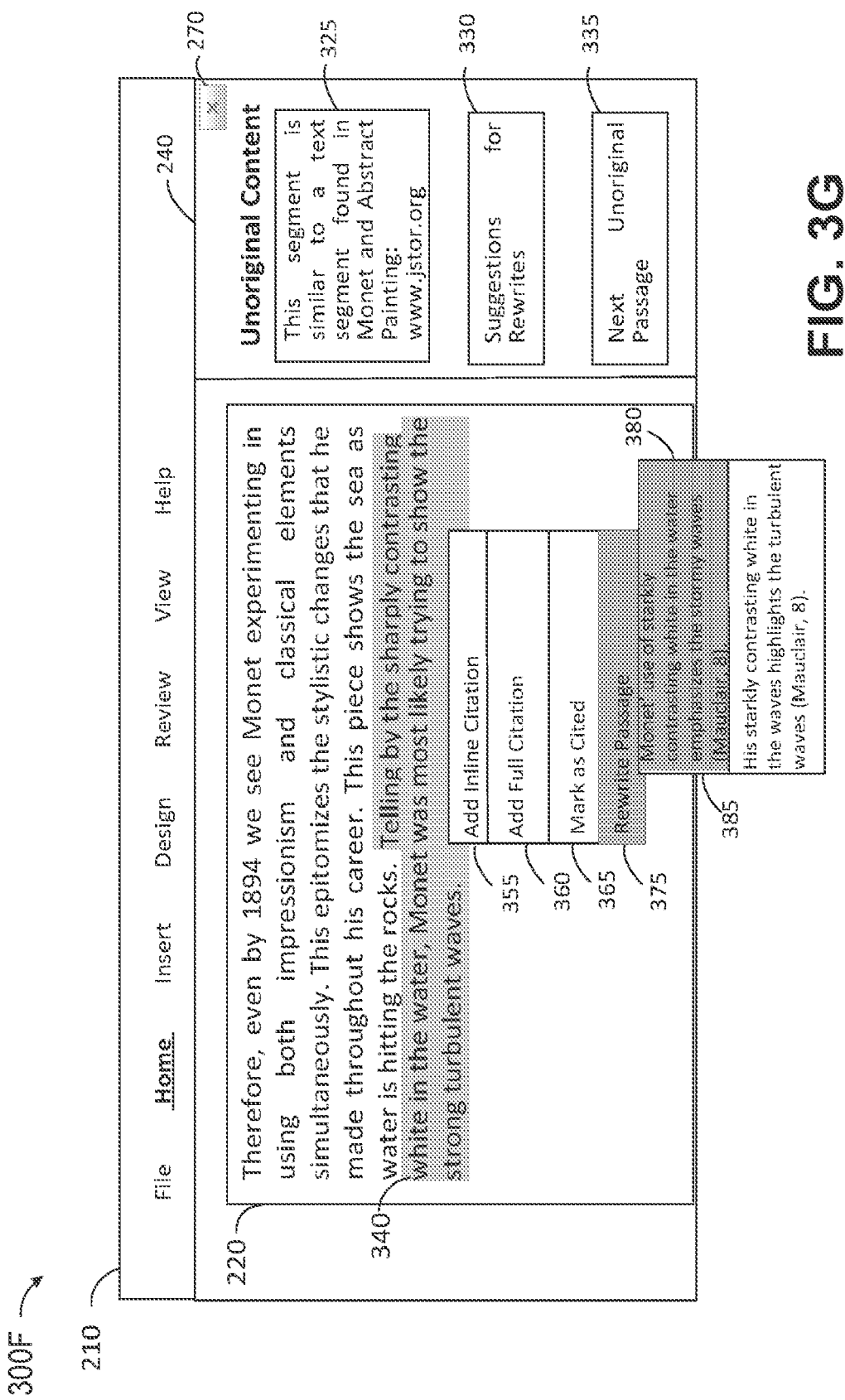

FIG. 3F depicts an example GUI screen 300F for enabling the user to request rewriting a selected passage. In one implementation, in addition to the previously discussed menu options, the context menu 350 may also include a menu option 375 for rewriting the selected unoriginal passage. Such a request may be received via the menu option 375 or the UI element 330. Once a request to rewrite an identified unoriginal passage has been received, the GUI screen may be updated to provide one or more suggested rewrites. This is illustrated in the example GUI screen 300G of FIG. 3G.

In one implementation, upon selecting the menu option 375 (e.g., hovering over the menu option 375 or clicking on the menu option if it operates as a drop-down menu), a context menu 380 may be displayed that provides one or more suggested rewrites. In an example, each of the menu options of the context menu 380 may present one suggested rewrite. In another example, a pop-menu or other type of UI element may be provided for presenting the suggested rewrites. For example, a UI element within the unoriginal content pane 240 may be utilized to present the suggested rewrite segments.

Figure 3H:
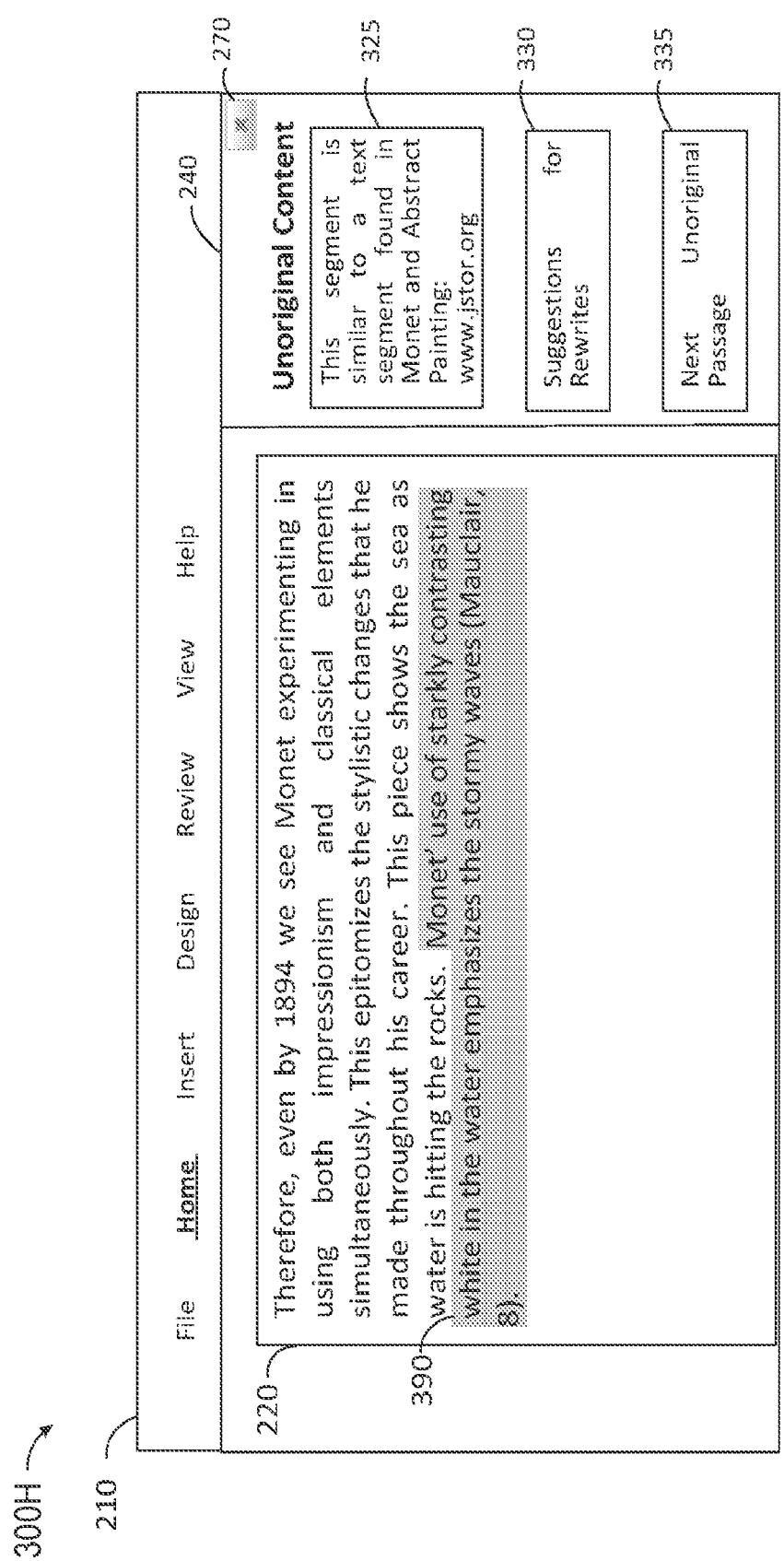

Once the suggested rewrite segments are displayed, the user may be able to choose one of the suggestions for replacing the identified unoriginal segment 340. For example, by clicking on or hovering over the suggested rewrite segment 385, the user may select that segment. Upon making a selection, the identified unoriginal segment 340 may be replaced by the suggested rewrite segment 385, as illustrated in FIG. 3H. As shown in the GUI screen 300H of FIG. 3H, when the suggested rewrite segment is used to replace the identified unoriginal segment, citation may be automatically added to the document to ensure proper reference is made to the resource from which the segment is derived. The formatting for the citation may be automatically determined based on the context and content of the document (e.g., by examining other citation formats used in the document). In another example, the user may be able to select the type of citation inserted with the suggested rewrite segment.

As mentioned above, the application providing the rewrite functionalities may collect information from the document and/or the user as the user interacts with the suggested replacement text segments to better train the ML models used in providing suggested replacement text segments. For example, the application may collect information relating to which one of the suggested replacement text segments was selected by the user. To ensure that context is taken into account, when using the information, the sentence structure and style of the document may also be collected. Additionally, other information about the document and/or the user may be collected. For example, information about the type of document (e.g., word document, email, presentation document, etc.), the topic of the document, the position of the user within an organization (e.g., the user's job title or department to which the user belongs, if known), and other non-linguistic features such as the time of the day, the date the device was used, the person to whom the document is directed (e.g., the to line in an email), and the like may be collected and used to provide better suggestions. The user specific information may be used, in one implementation, to provide customized suggestions for the user. It should be noted that in collecting and storing this information, care must be taken to ensure privacy is persevered.

In one implementation, to ensure compliance with ethical and privacy guidelines and regulations, an optional UI element may be provided to inform the user of the types of data collected, the purposes for which the data may be used and/or to allow the user to prevent the collection and storage of user related data. The UI may be accessible as part of features provided for customizing an application via a GUI displayed by the application when the user selects an options menu button. Alternatively, the information may be presented in a user agreement presented to the user when he/she first installs the application.

Figure 4:
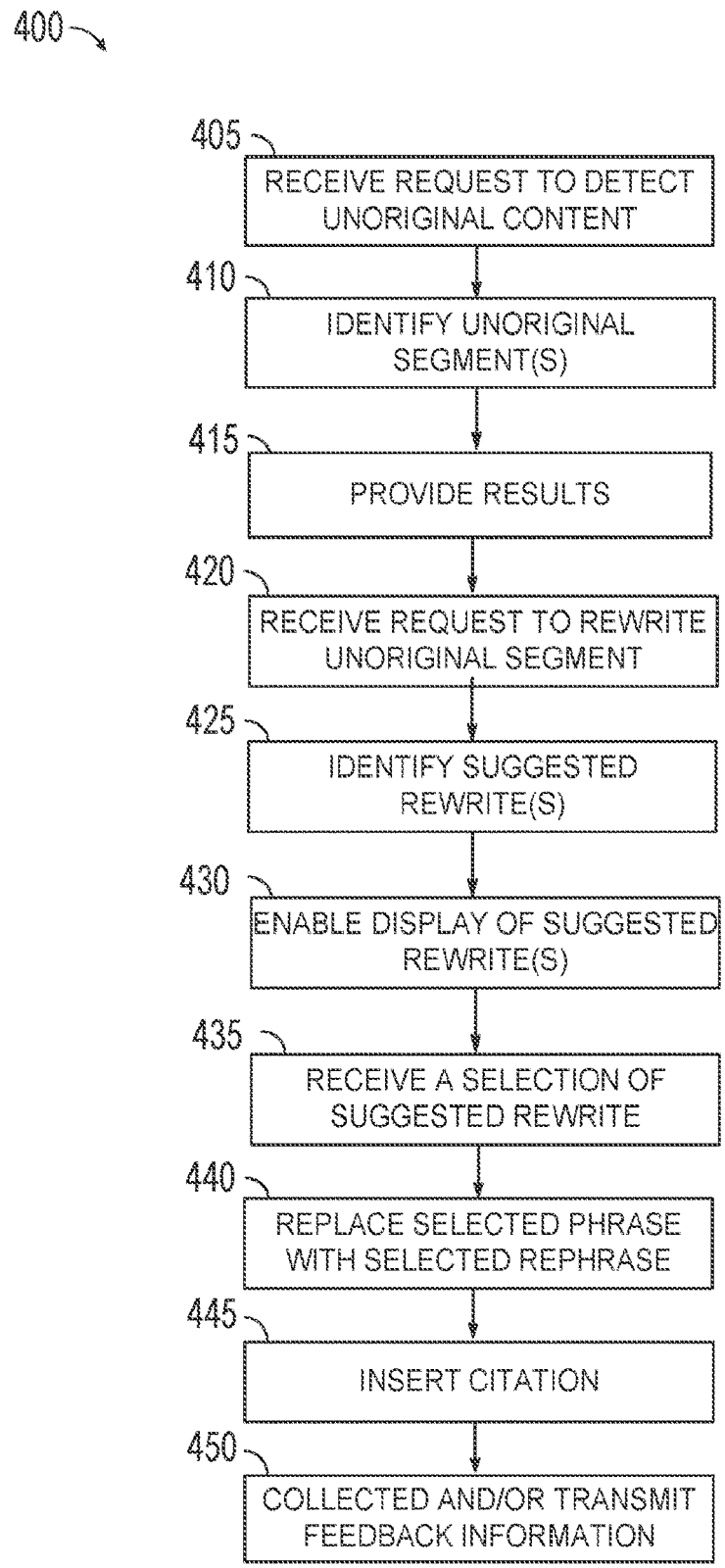
FIG. 4 is a flow diagram depicting an example method for detecting unoriginal text content and providing intelligent replacement text segment suggestions for addressing the unoriginality.

FIG. 4 is a flow diagram depicting an exemplary method 400 for detecting unoriginal text content and providing intelligent replacement text segment suggestions for addressing the unoriginality. At 405, method 400 may begin by receiving a request to detect unoriginal content in a document. This may occur, for example, when the user utilizes an input/output device (e.g. a mouse) coupled to a computer client device to a select a text segment (e.g., a text string containing one or more words) in a document displayed by the client device and proceeds to invoke a UI element to request that unoriginal content within the selected segment be detected. In one implementation, a request may be received when a predetermined action takes place within the content pane (e.g., a special character is entered, or a predetermined keyboard shortcut is pressed) after a segment within the contents has been selected. Alternatively, the user may invoke a UI element to request that unoriginal content within the entire document be identified.

Once a request to detect unoriginal content has been received, method 400 may proceed to identify unoriginal segment(s) within the selected text segment or the entire document, as the case may be, at 410. This may involve using a plagiarism detection service. In one implementation, the process of detecting unoriginal content may include removing superfluous words (e.g., words that are not important to determining originality such as "and", "or", "is" and the like) within the selected text portion (e.g., selected segment or entire document) and dividing the remaining words into segments of a predetermined size (e.g., segments of nine consecutive words). The process of dividing the selected text portion into segments may involve using a bag of n-grams model. As is known in the art, such a process for words may include using an n-grams model with a bag of words similarities. This may involve making a list of n-grams by first dividing a paragraph into sentences and then extracting n-grams for each sentence in the paragraph. For example, when the segments are 7 words each (e.g., n=7), for a sentence having 10 words, two 7-grams are extracted from the sentence. The first 7-gram includes the first 7 words of the sentence and the second 7-gram includes the last 7 words of the sentence. Thus, the 10-word sentence may result in two different 7-word segments that overlap each other.

Once the text has been divided into segments, those segments may be used for running searches in one or more databases. In one implementation, a first level search may be conducted by examining a user specific database to determine if a segment is similar to the user's often used words and speech patterns. This may use an ML model and may be achieved by collecting and storing user history data from documents prepared by the user, analyzing the data to identify often used words, phrases and speech patterns, and examining a segment against the collected data to determine if it passes a similarity threshold against the history data. For example, if a segment is more that 70% similar to the user's most often used words, phrases or speech patterns (e.g., ordering of words), then the segment may be eliminated from the list of segments for which a plagiarism check is performed. This may include performing intrinsic plagiarism detection where the entire document may be analyzed with respect to variations in writing style to identify potentially plagiarized segment. For example, if by examining the content of the document it is determined that a segment within the document has a completely different writing style than the reminder of the content, that segment may be flagged as potentially plagiarized. The user specific databases, discussed here, may be stored and buffered locally, or they may be stored in a cloud storage device.

If the plagiarism check is being performed to ensure originality against specific sources, an option may be provided to specify one or more databases against which the content can be checked for originality. For example, an enterprise may desire to check originality against documents created by other users in the enterprise (e.g., a university may desire to check student papers against other student papers). In such an instant, a specific database may be selected by the enterprise for the plagiarism check, in which case the segments may be compared against the text of the documents in the database.

When there is no need for use of a specific database, the segments remaining in the group of divided segments, after the first level search has been conducted, may be searched against publicly available documents. This may be done by using one or more search engines. In one example, the searching may involve searching for the exact quotes in each of the segments (e.g., using quotation marks around the segments). Alternatively, the search may be performed without using quotation marks. In one example, the search engines are publicly available search engines that may be accessed via the web (e.g., Bing). In another example, the search engines may be enterprise-based search engines. The top search results (e.g., the top 5 or top 10 results) for each search may then be examined to determine if any of the results contain a text portion that is sufficiently similar to the text segment searched. When searching is performed without using quotation marks, a lower number of top search results may be examined. For example, instead of examining the top 5 search results, only the top 1 result may be examined.

Examining the top search results may involve reviewing the number of similar words, their order, sentence structure and the like. If the similarity is determined to be within a predetermined range, then the text segment searched may be identified as an unoriginal segment and the search result may be identified as the source for the unoriginal segment. For example, if a top search result contains a certain number (e.g., five or more) of exact words as those in a segment and the words are in the same order as that of the segment, the segment may be identified as being unoriginal.

Once the selected text segments have been examined and the unoriginal segments identified, the results of the plagiarism detection may be provided, at 415. This may involve enabling display of a notification that the document contains one or more unoriginal segments. For example, a summary may be provided, as discussed above, to enable the user to view at a glance the number of unoriginal segments identified. Furthermore, the identified unoriginal segments may be displayed in an identifiable manner within the document. This may enable the user to request that an unoriginal segment be rewritten. As such, method 400 may proceed to receive a request to rewrite an identified unoriginal segment, at 420. This may be received via a UI element, as discussed above.

Upon receiving the request, a rephrasing service may be utilized to provide one or more appropriate rewrites, at 425. The process may involve examining the selected segment, consulting guidelines governing plagiarism, and examining additional information about the document and/or the user. This may be done by utilizing one or more text analytics algorithms that may examine the contents, context, formatting and/or other parameters of the document to identify the structure of the sentence containing the selected text segment, a style associated with the paragraph and/or the document, keywords associated with the document (e.g. the title of the document), the type of document, and the like.

The text analytics algorithms may include natural language processing algorithms that allow topic or keyword extractions, for example, in the areas of text classification and topic modeling. Examples of such algorithms include, but are not limited to, term frequency-inverse document frequency (TF-IDF) algorithms and latent Dirichlet allocation (LDA) algorithms. Topic modeling algorithms may examine the document to identify and extract salient words and items within the document that may be recognized as keywords. Keywords may then help determine the tone and type of document to help in determining the most appropriate replacement text segments. This is because different types of documents may use different terminology. For example, a scientific research article may need to use precise scientific terminology, while a poem may use allegories. Thus, by identifying and examining keywords, the rephrasing service may determine the topic of the document, which in turn, may help determine the tone and style of the document.

The additional information that may be collected and examined may include non-linguistic features of the document, the application and/or the user. For example, for a document that is being prepared for being sent to a recipient, (e.g., an email, letter or instant message), the person to whom the document is being directed may determine the tone and style of the document. Other non-linguistic features that may be taken into account include the type of document attached to an email, or the types of pictures, tables, charts, icons or the like included in the contents of a document. Many other types of characteristics about the document or the user may be collected, transmitted (e.g., when a rephrasing service is being used), and examined in determining the best possible alternative expressions for a text segment.

In one implementation, machine learning algorithms may be used to examine activity history of the user within the document or within the user's use of the application to identify patterns in the user's usage. For example, the types of replacement text segment suggestions accepted by the user in a previous session of the document (or earlier in the current session) may be examined to identify patterns. In another example, suggested rephases that have already been provided and not approved in a prior session (or earlier in the current session) may be eliminated from the list of identified suggestions. This may be done during a prioritization and sorting process of identified suggestions. The history may be limited to the user's recent history (i.e., during a specific recent time period or during the current session) or may be for the entirety of the user's use of the application. This information may be stored locally and/or in the cloud. In one implementation, the history data may be stored locally temporarily and then transmitted in batches to a data store in the cloud which may store each user's data separately for an extended period of time, as long as the user continues using the application or as long as the user has granted permission for such storage and use.

In one implementation, replacement text segment suggestion history and data extracted from other users determined to be in a same category as the current user (e.g., in the same department, having the same job title, or being part of the same organization) may also being examined at this stage. Furthermore, the rephrasing service or engine may consult a global database of rephrasing history and document contents to identify global patterns. In one implementation, in consulting the global database, the method identifies and uses data for users that are in a similar category as the current user. For example, the method may use history data from users with similar activities, similar work functions and/or similar work products. The history data may be specific for rewrites provided and used to replace unoriginal segments in documents. The database consulted may be global but also local to the current device.

The guidelines governing use of unoriginal content may include the number of words, and/or word ordering that is acceptable and/or required for distinguishing an unoriginal segment from a source. For example, a guideline may dictate that no more than 3 words in a segment can be the same words and in the same order as that of the source. The guideline governing use of unoriginal content may be different for different organizations. For example, a university may have different guidelines governing plagiarism than an enterprise. To accommodate this, a feature may be made available that enables users to set specific rules for rewriting unoriginal content. In an example, this may include selecting the number of exact words in the segment that can be the same as those in the source.

After examining the selected text segment and other information and taking into account the guidelines governing use of unoriginal content (e.g., rules for modifying content to remove the need for quotations), a list of relevant suggested replacement text segments may be identified, at 425. To comply with the guidelines, proper synonyms may be identified for one or more words (e.g., a majority of words) in the segment. Proper synonyms may be identified by finding words that are equivalent in meaning and/or context to those in the segment. In another example, ordering of the words in the segment can be changed. Once some of the words and/or ordering of the words have been changed, a fluency critique model may be applied to the rewritten text segment to ensure it is fluent. Furthermore, a clarity model may be applied to the rewritten text segment to determine if the meaning is clear. In one implementation, identifying relevant suggested replacement text segments may be achieved by utilizing two or more different types of trained ML models. One type could be a personal model which is trained based on each user's personal information and another could be a global model that is trained based on examination of a global set of other users' information. A hybrid model may be used to examine users similar to the current user and to generate results based on activities of other users having similar characteristics (same organization, having same or similar job titles, creating similar types of documents, and the like) as the current user. For example, it may examine users that create similar artifacts as the current user or create documents having similar topics. Any of the models may collect and store what is suggested and record how the user interacts with the suggestions (e.g., which suggestions they approve). This ensures that every time a user interacts with the system, the models learn from the interaction to make the suggestions better. The different models may be made aware of each other, so that they each benefit from what the other models are identifying, while focusing on a specific aspect of the task.

It should be noted that the models examining the contents and identifying suggested replacement text segments may be hosted locally on the client (e.g., local rephrasing engine) or remotely in the cloud (e.g., rephrasing service). In one implementation, some models are hosted locally, while others are stored in the cloud. This enables the client to provide some suggestions even when the client is not connected to a network. For example, the client may be able to provide a list of rephrasing suggestions based on the current document and other local documents, but it may not be able to provide suggestions based on other users. Once the client connects to the network, however, the application may be able to provide better and more complete suggestions.

Once one or more replacement text segment suggestions have been identified, method 400 may proceed to enable display of the identified suggestions, at 430. Enabling the display may include transmitting the identified suggestions to the local application running on the user's client device which may utilize one or more UI elements such as those discussed above to display the suggested replacement text segments on a display device associated with the client device. The format in which the suggestions are displayed may vary. However, in most cases, the suggestions may be displayed alongside the contents to enable easy reference to the contents.

Once the suggestions are displayed, method 400 may receive a selection of one of the suggested rewrites, at 435. When a suggested replacement text segment is selected, method 400 may proceed to replace the original text segment with the selected replacement text segment, at 440. This may involve replacing the identified unoriginal text segment with the selected suggestion. After replacing the given text segment with the suggestion, method 400 may proceed to automatically insert a citation for the selected rewrite, at 445. This may involve inserting an inline citation and/or inserting a full citation. In one implementation, an option may be presented to the user to select the type of citation desired. To determine the correct formatting for the citation, one or more citation rule formatting databases may be consulted.

Once the text is replaced and a proper citation is inserted, method 400 may proceed to collect information regarding the user's interaction with the suggestions for storage and/or transmission to the rephrasing service for use in further training of the rephrasing model(s), at 450. In one implementation, the information may include not only which one of the suggested replacement text segments were selected, but also the context of the original sentence, contents, and/or other information about the document or user, as discussed above. The information may also include the type of citation selected, if/when the user chooses to insert a citation instead of rewriting a phrase. Information that is user specific may be stored in a user-specific data store to be used in a customized model used for the user. The information may also be transmitted and stored in a global datastore used for training the global rephrasing models.

Because contextual information (e.g., surrounding words) and user specific information may need to be collected in order to provide a context for learning and since this information and all other linguistic features may contain sensitive and private information, compliance with privacy and ethical guidelines and regulations is important. Thus, the collection and storage of user data may need to be protected against both maleficent attackers who might expose private data and accidental leakage by suggestions made to other users having learned from the data. As such, during the process of collecting and transmitting feedback information, the information may be anonymized and encrypted, such that any user-specific information is removed or encrypted to ensure privacy.

Thus, technical solutions for detecting unoriginal content and providing intelligent replacement text segment suggestions for the identified unoriginal content to address the unoriginality are disclosed. The methods may utilize one or more machine-trained models developed for identifying relevant replacement text segments for a given text segment based on multiple factors including the context of a given text segment and rules governing use of unoriginal content. The suggestions may then be displayed on the same UI screen as the document contents to enable the user to quickly and efficiently approve the most appropriate suggested replacement text segment for the detected unoriginal text segment. This provides an easy and efficient technical solution for enabling users to not only detect unoriginal content but also replace them quickly and properly in their documents. This can improve the user's overall experience and increase their efficiency and proficiency when writing.

Figure 5:
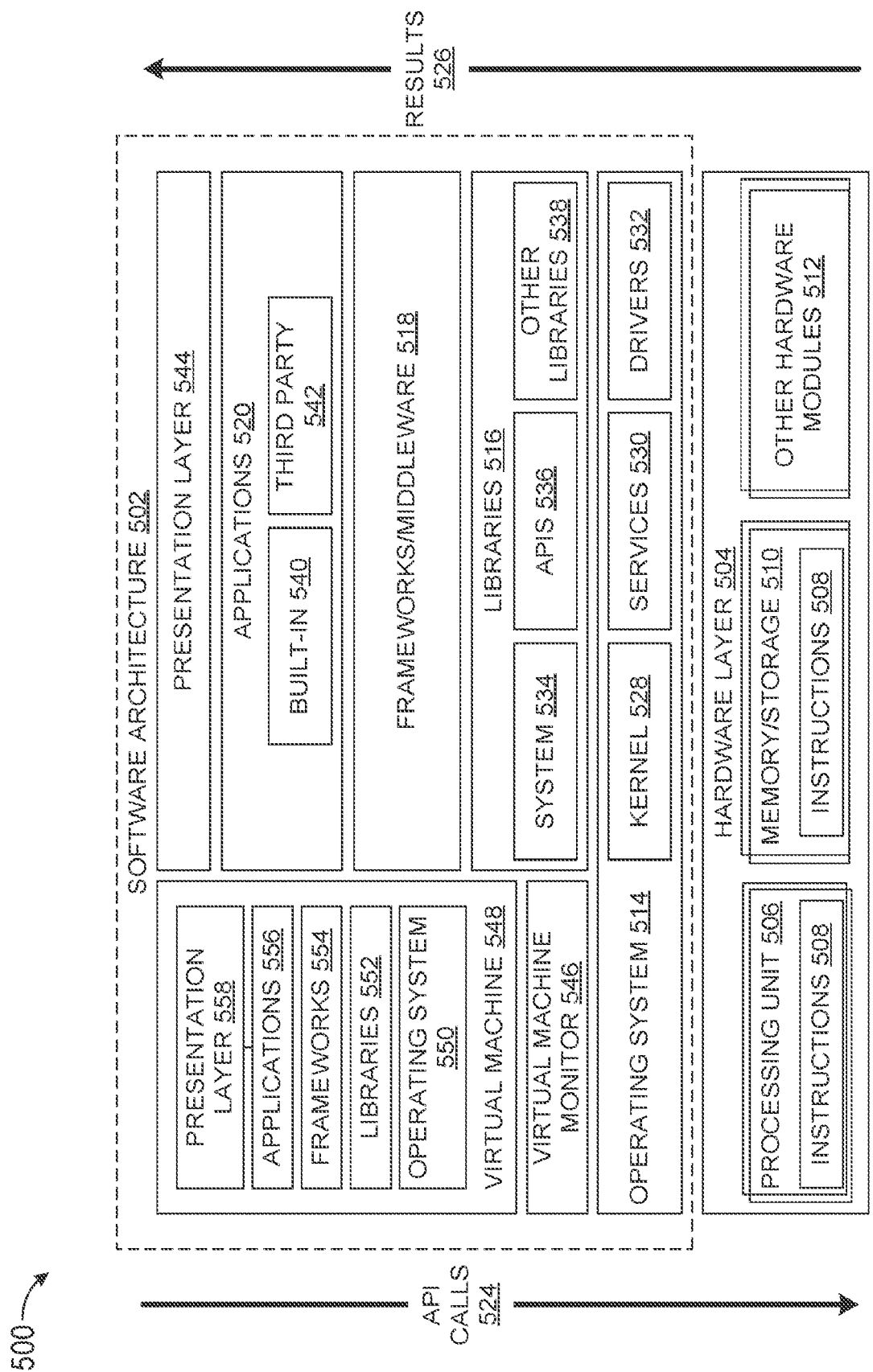
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various GUI functions, high-level resource management, or high-level location services. The frameworks 518 may provide a broad spectrum of other APIs for applications 520 and/or other software modules.

The applications 520 include built-in applications 520 and/or third-party applications 522. Examples of built-in applications 520 may include, but are not limited to, a contacts application, a browser application, a location application, a media application, a messaging application, and/or a game application. Third-party applications 522 may include any applications developed by an entity other than the vendor of the particular system. The applications 520 may use functions available via OS 514, libraries 516, frameworks 518, and presentation layer 524 to create user interfaces to interact with users.

Some software architectures use virtual machines, as illustrated by a virtual machine 528. The virtual machine 528 provides an execution environment where applications/modules can execute as if they were executing on a hardware machine (such as the machine 600 of FIG. 6, for example). The virtual machine 528 may be hosted by a host OS (for example, OS 514) or hypervisor, and may have a virtual machine monitor 526 which manages operation of the virtual machine 528 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
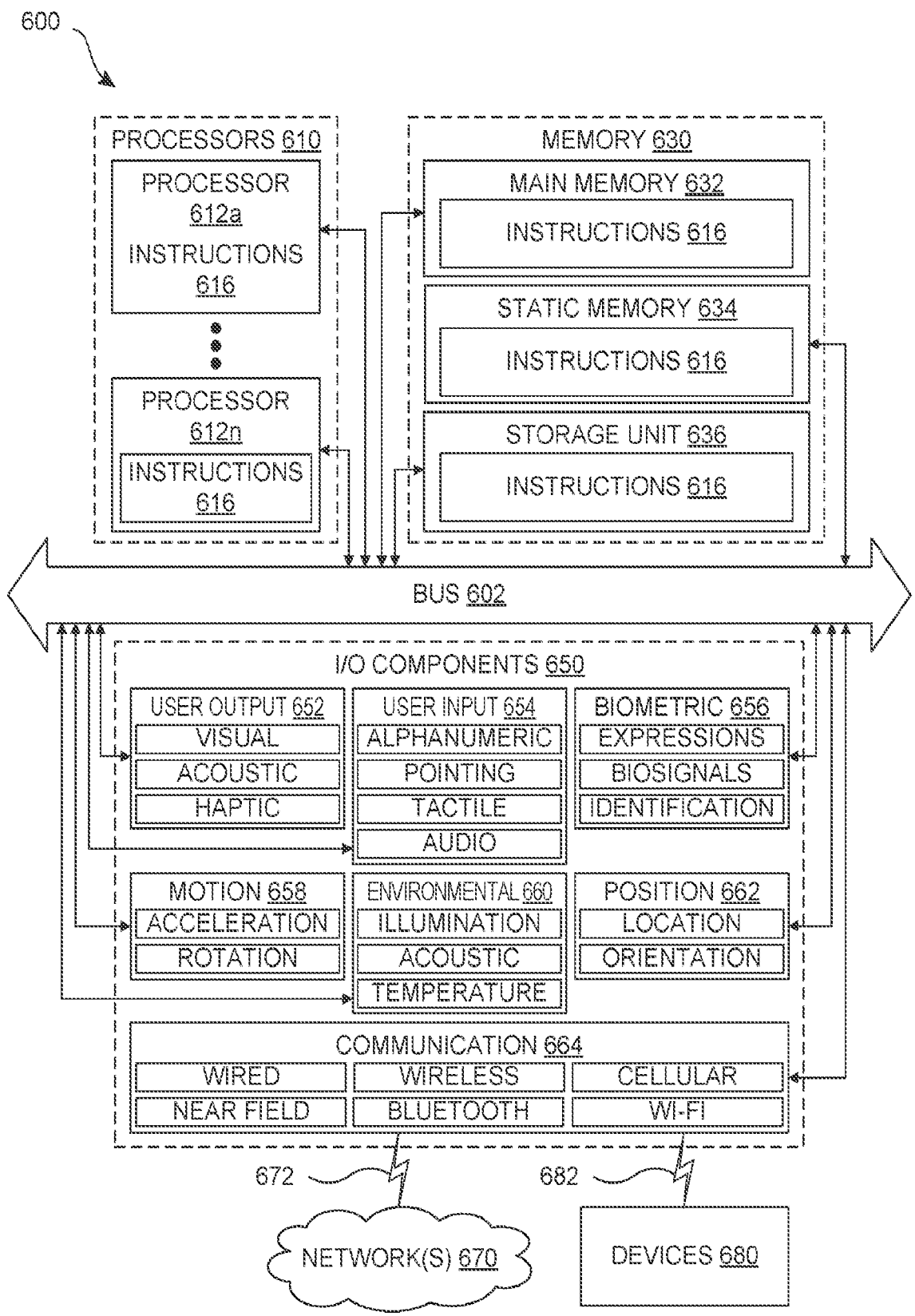
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory storing executable instructions that, when executed by the processor, cause the data processing system to perform functions of:
examining a portion of a document to determine if the portion includes a text segment containing unoriginal content;

upon determining that the portion includes the text segment, enabling display of a notification on a user interface that the text segment contains unoriginal content;

receiving a request, via a network, to provide a replacement text segment for the text segment; and upon receiving the request, identifying at least one replacement text segment for the text segment, based at least in part on one or more rules governing use of content from a source, wherein the replacement text segment includes a citation for the source.

Item 2. The data processing system of item 1, wherein the instructions further cause the processor to cause the data processing system to perform functions of:

collecting user feedback information relating to a user's selection of the replacement text segment;

ensuring that the feedback information is privacy compliant; and storing the feedback information for use in improving a machine learning model used to provide the replacement text segment.

Item 3. The data processing system of items 1 or 2, wherein the notification includes identifying the text segment.

Item 4. The data processing system of any of the preceding items, wherein the notification includes identifying the source with which the text segment is identified as being similar.

Item 5. The data processing system of any of the preceding items, wherein the instructions further cause the processor to cause the data processing system to perform functions of:

enabling display of a plurality of citation formats for inserting the citation for the source;

receiving a selection of one of the plurality of citation formats; and inserting the citation according to the received selected citation format.

Item 6. The data processing system of any of the preceding items, wherein the plurality of citation formats include an inline citation and a full citation.

Item 7. The data processing system of any of the preceding items, wherein the plurality of citation formats are provided based at least in part on a content of the document.

Item 8. A method for providing replacement text segment suggestions for an unoriginal text segment in a document, comprising:

examining a portion of the document to determine if the portion includes a text segment containing unoriginal content;

upon determining that the portion includes the unoriginal text segment, enabling display of a notification on a user interface that the text segment contains unoriginal content;

receiving a request, via a network, to provide the replacement text segment for the unoriginal text segment; and upon receiving the request, identifying the replacement text segment for the text unoriginal segment, based at least in part on one or more rules governing use of content from a source, wherein the replacement text segment includes a citation for the source.

Item 9. The method of item 8, further comprising:

collecting user feedback information relating to the user's selection of the replacement text segment;

ensuring that the feedback information is privacy compliant; and storing the feedback information for use in improving a machine learning model used to provide the replacement text segment.

Item 10. The method of items 8 or 9, further comprising providing the replacement text segment for displaying to the user.

Item 11. The method of item 10, wherein providing the replacement text segment for displaying to the user includes displaying the identified replacement text segment on a user interface element relating to the document.

Item 12. The method of item 10, further comprising:

receiving a selection of the replacement text segment; and upon receiving the selection, replacing the unoriginal text segment with the replacement text segment.

Item 13. The method of items 8-11, further comprising:

enabling display of a plurality of citation formats for inserting the citation for the source;

receiving a selection of one of the plurality of citation formats; and inserting the citation according to the received selected citation format.

Item 14. The method of item 13, wherein the plurality of citation formats include an inline citation and a full citation.

Item 15. A non-transitory computer readable medium on which are stored instructions that, when executed, cause a programmable device to:

examine a portion of a document to determine if the portion includes a text segment containing unoriginal content;

upon determining that the portion includes the text segment, enable display of a notification on a user interface that the text segment contains unoriginal content;

receive a request, via a network, to provide a replacement text segment for the text segment; and upon receiving the request, identify at least one replacement text segment for the text segment, based at least in part on one or more rules governing use of content from a source, wherein the replacement text segment includes a citation for the source.

Item 16. The non-transitory computer readable medium of item 15, wherein the instructions further cause the programmable device to:

collect user feedback information relating to the user's selection of the identified at least one replacement text segment;

ensure that the feedback information is privacy compliant; and store the feedback information for use in improving a machine learning model used to provide the replacement text segment.

Item 17. The non-transitory computer readable medium of items 15 or 16, wherein the instructions further cause the programmable device to provide the replacement text segment for displaying to the user.

Item 18. The non-transitory computer readable medium of items 15-17, wherein the instructions further cause the programmable device to:

receive a selection of the replacement text segment; and upon receiving the selection, replace the unoriginal text segment with the replacement text segment.

Item 19. The non-transitory computer readable medium of items 15-18, the notification includes identifying the source with which the text segment is identified as being similar.

Item 20. The non-transitory computer readable medium of items 15-19, wherein the notification includes identifying the text segment.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
    a processor; and
    a memory in communication with the processor, the memory comprising executable instructions that, when executed by, the processor, cause the data processing system to perform functions of:
    finding a portion of a document with a user-specific machine learning model, then examining the portion of the document to determine if the portion includes a text segment containing unoriginal content;
    upon determining that the portion includes the text segment, enabling display of a notification on a user interface that the text segment contains unoriginal content;
    receiving a request, via a network, to provide a replacement text segment for the text segment; and
    upon receiving the request, identifying at least one replacement text segment for the text segment, based at least in part on a guideline relating to use of content that is included in a source,
    wherein the replacement text segment includes a citation for the source, and
    wherein finding a portion of a document with a user-specific machine learning model comprises:
        dividing the document into a list of text segments;
        collecting and storing data from other documents prepared by a user;
        analyzing the data to identify the user's often used words, phrases and speech patterns;
        examining at least one text segment from the list of text segments to determine if the at least one text segment passes a similarity threshold against the user's often used words, phrases and speech patterns;
        responsive to the at least one text segment text segment passing the similarity threshold, eliminating the at least one text segment from the list of text segments; and
        marking the list of text segments as the portion of the document.

2. The data processing system of claim 1, wherein the instructions further cause the processor to cause the data processing system to perform functions of:
    collecting user feedback information relating to the user's selection of the replacement text segment;
    ensuring that the user feedback information is privacy compliant; and
    storing the user feedback information for use in improving a machine learning model used to provide the replacement text segment.

3. The data processing system of claim 1, wherein the notification includes identifying the text segment.

4. The data processing system of claim 1, wherein the notification includes identifying the source with which the text segment is identified as being similar.

5. The data processing system of claim 1, wherein the instructions further cause the processor to cause the data processing system to perform functions of:
    enabling display of a plurality of citation formats for inserting the citation for the source;
    receiving a selection of one of the plurality of citation formats; and
    inserting the citation according to the received selected citation format.

6. The data processing system of claim 5, wherein the plurality of citation formats include an inline citation and a full citation.

7. The data processing system of claim 6, wherein the plurality of citation formats are provided based at least in part on a content of the document.

8. A method for providing replacement text segment suggestions for an unoriginal text segment in a document, comprising:
  finding a portion of a document with a user-specific machine learning model, then examining the portion of the document to determine if the portion includes a text segment containing unoriginal content;
  upon determining that the portion includes the unoriginal text segment, enabling display of a notification on a user interface that the text segment contains unoriginal content;
  receiving a request, via a network, to provide the replacement text segment for the unoriginal text segment; and
  upon receiving the request, identifying the replacement text segment for the text unoriginal segment, based at least in part on a guideline relating to use of content that is included in a source,
  wherein the replacement text segment includes a citation for the source, and
  wherein finding a portion of a document with a user-specific machine learning model comprises:
    dividing the document into a list of text segments;
    collecting and storing data from other documents prepared by a user;
    analyzing the data to identify the user's often used words, phrases and speech patterns;
    examining at least one text segment from the list of text segments to determine if the at least one text segment passes a similarity threshold against the user's often used words, phrases and speech patterns;
    responsive to the at least one text segment text segment passing the similarity threshold, eliminating the at least one text segment text segment from the list of text segments; and
    marking the list of text segments as the portion of the document.

9. The method of claim 8, further comprising:
  collecting user feedback information relating to the user's selection of the replacement text segment;
  ensuring that the user feedback information is privacy compliant; and
  storing the user feedback information for use in improving a machine learning model used to provide the replacement text segment.

10. The method of claim 8, further comprising providing the replacement text segment for displaying to the user.

11. The method of claim 10, wherein providing the replacement text segment for displaying to the user includes displaying the identified replacement text segment on a user interface element relating to the document.

12. The method of claim 10, further comprising:
  receiving a selection of the replacement text segment; and
  upon receiving the selection, replacing the unoriginal text segment with the replacement text segment.

13. The method of claim 8, further comprising:
  enabling display of a plurality of citation formats for inserting the citation for the source;
  receiving a selection of one of the plurality of citation formats; and
  inserting the citation according to the received selected citation format.

14. The method of claim 13, wherein the plurality of citation formats include an inline citation and a full citation.

15. A non-transitory computer readable medium on which are stored instructions that, when executed, cause a programmable device to perform operations of:
  finding a portion of a document with a user-specific machine learning model, then examining the portion of the document to determine if the portion includes a text segment containing unoriginal content;
  upon determining that the portion includes the text segment, enabling display of a notification on a user interface that the text segment contains unoriginal content;
  receiving a request, via a network, to provide a replacement text segment for the text segment; and
  upon receiving the request, identifying at least one replacement text segment for the text segment, based at least in part on a guideline relating to use of content that is included in a source,
  wherein the replacement text segment includes a citation for the source, and
  wherein finding a portion of a document with a user-specific machine learning model comprises:
    dividing the document into a list of text segments;
    collecting and storing data from other documents prepared by a user;
    analyzing the data to identify the user's often used words, phrases and speech patterns;
    examining at least one text segment from the list of text segments to determine if the at least one text segment passes a similarity threshold against the user's often used words, phrases and speech patterns;
    responsive to the at least one text segment text segment passing the similarity threshold, eliminating the at least one text segment from the list of text segments; and
    marking the list of text segments as the portion of the document.

16. The non-transitory computer readable medium of claim 15, wherein the instructions further cause the programmable device to perform operation of:
  collecting user feedback information relating to the user's selection of the identified at least one replacement text segment;
  ensuring that the user feedback information is privacy compliant; and
  storing the user feedback information for use in improving a machine learning model used to provide the replacement text segment.

17. The non-transitory computer readable medium of claim 15, wherein the instructions further cause the programmable device to provide the replacement text segment for displaying to the user.

18. The non-transitory computer readable medium of claim 17, wherein the instructions further cause the programmable device to perform operation of:
  receiving a selection of the replacement text segment; and
  upon receiving the selection, replacing the unoriginal text segment with the replacement text segment.

19. The non-transitory computer readable medium of claim 15, wherein the notification includes identifying the source with which the text segment is identified as being similar.

20. The non-transitory computer readable medium of claim 15, wherein the notification includes identifying the text segment.

* * * * *